United States Patent
Hueger et al.

(10) Patent No.: US 9,428,220 B2
(45) Date of Patent: Aug. 30, 2016

(54) METHOD AND DEVICE FOR MANEUVERING A TRAILER

(71) Applicant: Volkswagen Aktiengesellschaft, Wolfsburg (DE)

(72) Inventors: Philipp Hueger, Ruehen (DE); Ulrich Wuttke, Braunschweig (DE); Daniel Leuchter, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 14/612,552

(22) Filed: Feb. 3, 2015

(65) Prior Publication Data
US 2015/0149040 A1 May 28, 2015

Related U.S. Application Data

(63) Continuation of application No. PCT/EP2013/060055, filed on May 15, 2013.

(30) Foreign Application Priority Data

Aug. 3, 2012 (DE) .................. 10 2012 015 435

(51) Int. Cl.
*B62D 13/06* (2006.01)
*B62D 15/02* (2006.01)
*G01B 11/27* (2006.01)

(52) U.S. Cl.
CPC ............. *B62D 13/06* (2013.01); *B62D 15/027* (2013.01); *B62D 15/028* (2013.01); *B62D 15/0275* (2013.01); *B60R 2300/80* (2013.01); *G01B 11/272* (2013.01)

(58) Field of Classification Search
CPC B62D 13/06; B62D 15/028; B62D 15/0275; B62D 15/027; B60R 2300/80; G01B 11/272
USPC ............... 701/41; 280/426, 442, 400, 407.1, 280/423.1; 180/235; 340/431
See application file for complete search history.

(56) References Cited

U.S. PATENT DOCUMENTS

| 4,848,499 A * | 7/1989 | Martinet ................ B62D 15/00 180/443 |
| 8,223,204 B2 | 7/2012 | Hahn |
| 8,798,860 B2 | 8/2014 | Dechamp |
| 2010/0222964 A1 * | 9/2010 | Dechamp .............. B62D 15/027 701/41 |
| 2012/0185131 A1 | 7/2012 | Headley |

FOREIGN PATENT DOCUMENTS

| DE | 198 06 655 A1 | 8/1999 |
| DE | 100 65 230 A1 | 7/2002 |
| DE | 101 54 612 A1 | 5/2003 |
| DE | 10 2006 048 947 A1 | 4/2008 |
| DE | 10 2007 011 180 A1 | 9/2008 |
| DE | 10 2007 029 413 A1 | 1/2009 |
| EP | 2 388 180 A2 | 11/2011 |
| GB | 2 398 050 A | 8/2004 |
| WO | WO 2006/136664 A1 | 12/2006 |
| WO | WO 2008/012109 A1 | 1/2008 |

* cited by examiner

*Primary Examiner* — Marthe Marc-Coleman
(74) *Attorney, Agent, or Firm* — Muncy, Geissler, Olds & Lowe, P.C.

(57) ABSTRACT

A method and a device for maneuvering a combination of a towing vehicle and a trailer, wherein the trailer is connected to the towing vehicle by a non-steerable tow-bar, and the towing vehicle observes the rear surroundings, including the trailer, by a rear-view camera. The method includes the steps: a) determining the actual articulation of the trailer relative to the towing vehicle; b) determining the length of the tow-bar and the maximum articulation of the trailer; c) inputting the intended articulation of the trailer; d) reversing the towing vehicle with at least active steering support until the intended articulation of the trailer is reached; e) fixing the direction of travel predetermined by the intended articulation; f) maneuvering the towing vehicle with at least active steering support while maintaining the predetermined direction of travel until an eventual parking position is reached.

11 Claims, 10 Drawing Sheets

METHOD AND DEVICE FOR MANEUVERING A TRAILER

This nonprovisional application is a continuation of International Application No. PCT/EP2013/060055, which was filed on May 15, 2013, and which claims priority to German Patent Application No. 10 2012 015 435.6, which was filed in Germany on Aug. 3, 2012, and which are both herein incorporated by reference.

BACKGROUND OF THE INVENTION

1. Field of the Invention

The present invention relates to a method for maneuvering a trailer of a motor vehicle, as well as to a device for maneuvering a trailer of a motor vehicle, i.e., a trailer maneuvering assistant.

2. Description of the Background Art

Maneuvering a combination comprising a motor vehicle and a trailer is generally viewed as difficult, the difficulty increasing during reversing, since the trailer tends to swing out. Steering the trailer of a combination is not easily grasped, especially for inexperienced individuals, if the steering angle of the tow vehicle changes during reversing, so that a collision with an adjacent obstacle or a jack-knifing of the combination frequently occurs when parking a combination, due to an unfavorable steering angle selected by the driver.

An electronic maneuvering aid for reversing a truck, which has a steerable trailer, is known from publication DE 198 06 655 A1, the trailer being coupled with the rear trailer coupling of the truck via a tow bar. The position of the trailer and truck are ascertained via sensors at the beginning of the reversing maneuver. A control unit controls the steering of the truck, based on the measured angles combined with the dimensions of the truck and the trailer, so that the truck and the trailer both move along calculated circular paths.

A method for steering a tow vehicle having a trailer during a reversing maneuver is known from publication DE 101 54 612 A1, whereby an electronic control unit predetermines at least the corrections for the steering angle of the steerable wheels of the tow vehicle as a function of angles between the longitudinal axis of the tow vehicle and the longitudinal axis of the trailer, i.e., the position of the tow bar. The angle is ascertained from the signals of at least two distance sensors, which are provided on the tow vehicle or on the trailer, to determine the particular distance between the tow vehicle and the trailer.

A control unit for a trailer to be coupled to a vehicle is known from publication DE 10 2006 048 947 A1, which is incorporated herein by reference, with the aid of which the trailer may be moved from a first position to a second position with respect to the vehicle, whereby, in particular the reverse parking maneuver of a vehicle having a coupled trailer is made easier. The driver of the vehicle may select an angle between the central longitudinal axis of the vehicle and the central longitudinal axis of the trailer, so that, during a reversing maneuver, the control unit moves the trailer from the instantaneous angular position to the selected setpoint angular position. The turn-signal lever, combined with the reverse gear, is used as the control element for selecting the angular position, the selected angle being variable during the reversing maneuver. The instantaneous angle of the trailer is furthermore detected with the aid of a rotation angle sensor mounted in the hitch ball of the tow bar. The disadvantage is that the setpoint angle is set during travel. Furthermore, the detection of the instantaneous tow bar angle requires a separate sensor disposed in the hitch ball of the tow bar, which is associated with additional costs.

SUMMARY OF THE INVENTION

It is therefore an object of the present invention to provide a simplified method for maneuvering a combination and a corresponding trailer maneuvering assistant.

In an embodiment, a method is provided for maneuvering a combination comprising a tow vehicle and a trailer, the trailer being connected to the tow vehicle with the aid of a non-steerable tow bar and the tow vehicle monitoring the rear surroundings, including the trailer, with the aid of a rear-view mirror. The method can include the steps of: (a) determining the actual articulation of the trailer relative to the tow vehicle; (b) determining the tow bar length and the maximum articulation of the trailer; (c) inputting the setpoint articulation of the trailer; (d) reversing the tow vehicle with at least active steering assistance until achieving the setpoint articulation of the trailer; (e) fixing the direction of travel predetermined by the setpoint articulation; (f) maneuvering the tow vehicle with at least active steering assistance, maintaining the predetermined direction of travel until reaching a final parking position.

The aforementioned step f) can be carried out, in that, in a first step f1), by maneuvering the tow vehicle, the longitudinal axis of the tow vehicle is brought into alignment with the longitudinal axis of the trailer, maintaining the predetermined direction of travel, and in a subsequent second step f2), a reversing of the combination oriented in a straight line takes place with at least active steering assistance until the final parking position is reached. In other words, the tow vehicle should be oriented in alignment with the longitudinal axis of the trailer, without the direction of the trailer being changed, so that, in the further progression, the combination is maneuvered in the reverse direction into the final stopped position in step f2.

To carry out step f1), two modes can be available, the first mode relating to the maneuvering on a wide roadway and the second mode relating to maneuvering on a narrow roadway. A wide roadway can mean sufficient maneuvering space, i.e., maneuvering, for example, on a large square or a large meadow, where the final parking position does not have to be precisely set, and the combination has, in particular, lateral space for maneuvering. A narrow roadway, can be, for example, a limited maneuvering space, i.e., in particular a narrow lateral clearance. A situation of this type exists, for example, in a narrow driveway or a gateway.

Step f1) may be carried out in the first mode in a single-point maneuver, so that the target trajectory of step f2) for reaching the final parking position in the first mode is parallel to the predetermined direction of travel.

Step f1) may furthermore be carried out in the second mode in a multi-point maneuver, so that the target trajectory of step f2) for reaching the final parking position in the second mode is in the predetermined direction of travel.

The setpoint articulation may furthermore be entered in step c) while stopped or while reversing. The driver may monitor the surroundings recorded by the rear-view camera in a separate display.

A trailer maneuvering assistant of a motor vehicle according to an embodiment of the invention for carrying out the method described above includes a control device, an HMI device (Human Machine Interface) for communicating with the driver of the motor vehicle, a device for detecting a coupled trailer and an actuator for actuating the steering system, wherein the trailer maneuvering assistant has a rear-view camera for recording images of the rear surroundings, wherein the control device has a device for determining the actual articulation and for determining the maximum permissible articulation of the coupled trailer from the images of the rear-view camera, wherein the HMI device has a device for entering a setpoint articulation of the trailer, and wherein the HMI device dynamically displays the actual position of the trailer in the actual articulation and the setpoint position of the trailer in the setpoint articulation.

The driver thus receives a direct representation of the actual position and the desired setpoint position of the trailer or the combination and is always informed of the progression of the trailer assistance. Furthermore, the image of the surroundings from the rear-view camera may also be transmitted to a suitable central display, so that the driver may monitor and control the progress of the assistance in the real-life surroundings. The actual articulation and the setpoint articulation may also be displayed in the real-life image. The actual position and the virtual setpoint position are usually displayed in the HMI representation as viewed from above.

To activate the assistant, the HMI device can transmit a predetermined number of informational indications to the driver of the motor vehicle. Informational indications of this type are the prompts to activate the trailer maneuvering assistant, indications about an active steering intervention and indications on operating the assistant.

The HMI device also can have a device for fixing an achieved setpoint articulation, the control device using the fixed setpoint articulation as a predetermined direction for ascertaining a target trajectory for reaching a final parking position. Fixing the achieved setpoint articulation sets the direction of the further movement of the combination.

The HMI device also can have a selecting device, with the aid of which it is selected whether the target trajectory runs parallel to the predetermined direction or in the direction of the predetermined direction. In the first mode, a single-point maneuver may thus be carried out, while in the second mode, the maneuver is generally a multi-point one. This measure ensures the behavior in narrow or wide driving environments.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
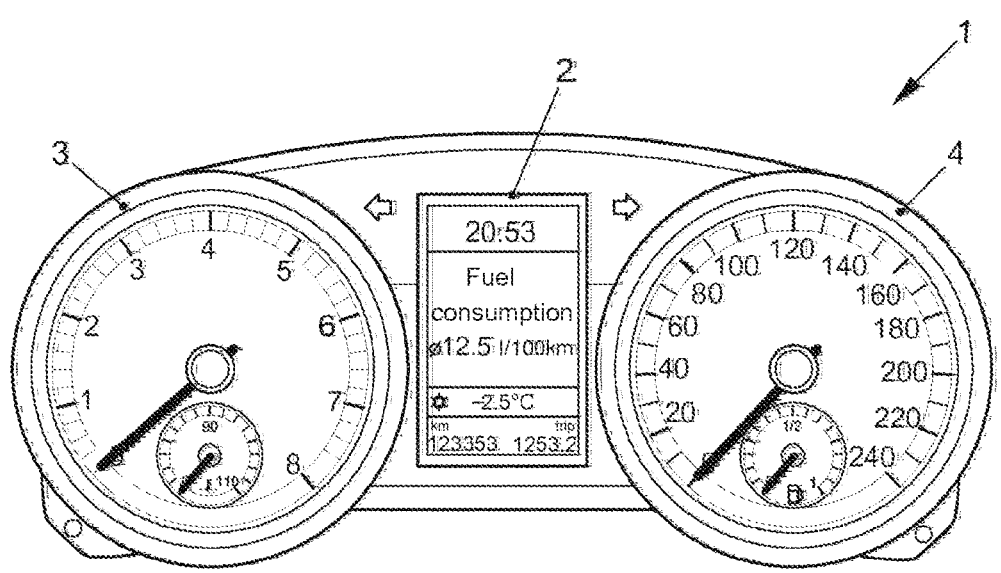
FIG. 1 shows an instrument cluster having a central display.

FIG. 1 shows a common instrument cluster 1, which is employed in today's motor vehicles and which is also used to display information of diverse driver assistance systems when no other separate display might be present. Instrument cluster 1 includes a central display 2, which is disposed between left tachometer 3 and right speedometer 4. Diverse information that is important for the driver may be displayed on central display 2, such as, in this case, the time, the average fuel consumption, the outdoor temperature and the distance traveled as well as the mileage. Central display 2 is furthermore used as a human-machine interface for driver assistance systems, for example, a park steering assistant, for the purpose of displaying information. If central display 2 is used for a trailer maneuvering assistant, the trailer maneuvering assistant uses an existing PSA control unit (PSA=park steering assistant), the hitching of a trailer to the motor vehicle being detected, and the normal park steering assistant being deactivated. In other words, if a trailer is coupled, the trailer maneuvering assistant is implemented on the PSA control unit, an operation of the trailer maneuvering assistant being possible before and during maneuvering. Finally, the motor vehicle should also be equipped with a rear-view camera.

Figure 2:
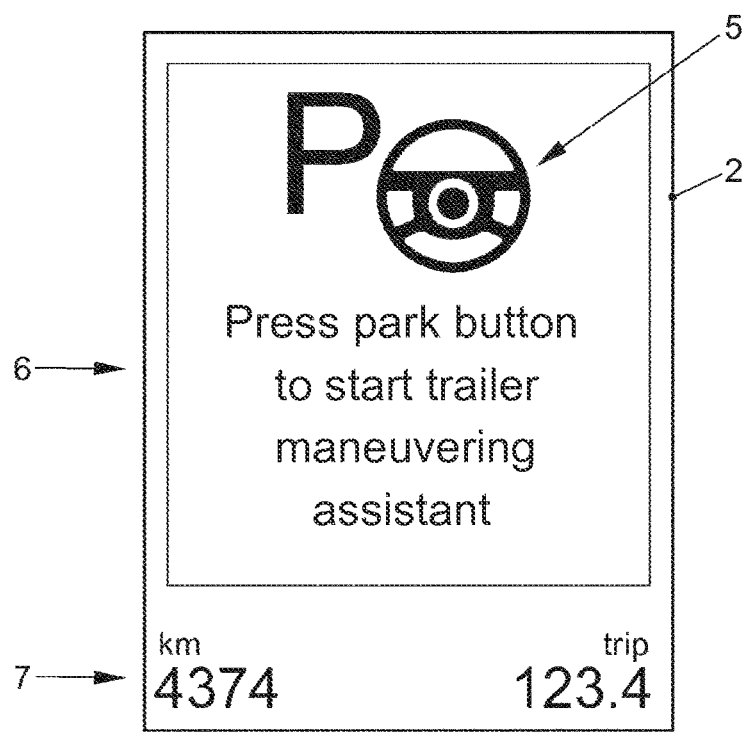
FIG. 2 shows a start request of the trailer maneuvering assistant.

FIG. 2 shows the start request for initiating the trailer maneuvering assistant. If the trailer is coupled, and upon engaging the reverse gear, a start request is displayed in central display 2, which may have the appearance shown in FIG. 2. In addition to a logo 5, which includes a symbolic steering wheel and an upper-case letter "P, text 6, "Press park button to start trailer maneuvering assistant" is displayed on central display 2. The driver of the motor vehicle is thus prompted to use the same button provided for the park steering assistant for starting the trailer maneuvering assistant. Since full central display 2 is not used to display the start request for the trailer maneuvering assistant, space 7 remains for displaying additional information, in this case the mileage, including the trip mileage.

A start of the trailer maneuvering assistant thus takes place by actuating the corresponding actuator, which, in this specific embodiment, is formed by the PSA button. If no actuation of the PSA button takes place within a predetermined period of time, the start request disappears from the central display. It is furthermore assumed that the driver does not require any assistance from the trailer maneuvering assistant when the driver places the motor vehicle in motion. Without pressing the PSA button or by moving the vehicle, the driver may therefore maneuver the trailer without assistance.

Figure 3:
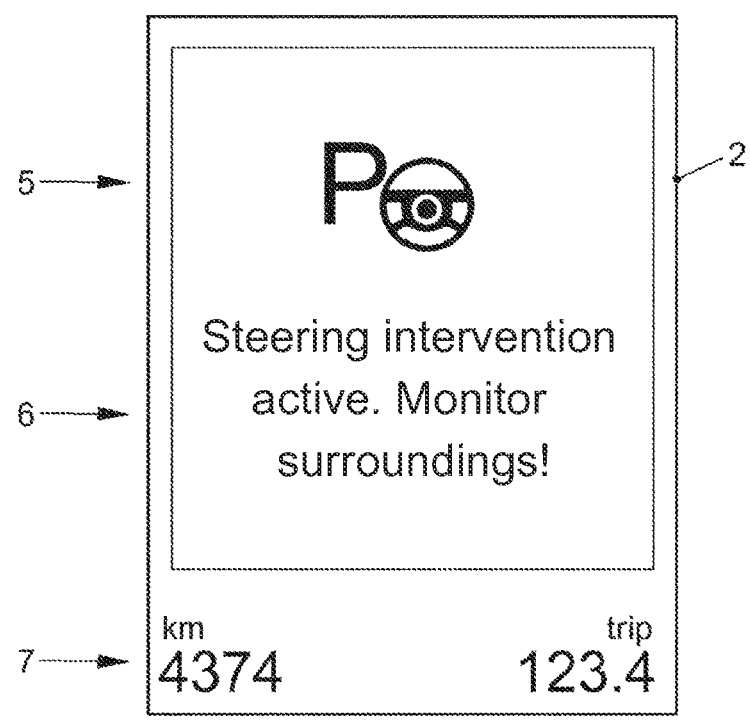
FIG. 3 shows an indication for an active steering intervention of the assistant.

FIG. 3 shows the next step within the operating procedure of the trailer maneuvering assistant. Once the trailer maneuvering assistant has been placed into operation by pressing the PSA button, an indication is displayed to the driver in central display 2, stating that the trailer maneuvering assistant is active and an active steering wheel intervention is taking place. In other words, the driver should not grip the steering wheel, since the steering is being handled by the trailer maneuvering assistant. This notification may take place by text 6 "Steering intervention active. Monitor surroundings," logo 5 of the trailer maneuvering assistant also being display in central display 2.

With the notification of the active trailer maneuvering assistant, the corresponding legal requirement is satisfied, the notification of the active steering intervention disappearing again after a predetermined period of time.

Figure 4:
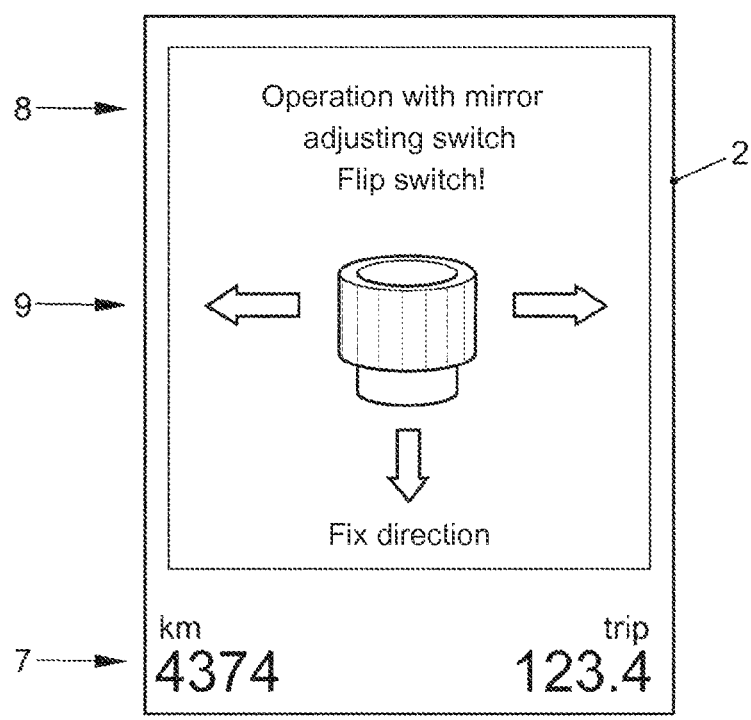
FIG. 4 shows a prompt for operating the trailer maneuvering assistant.

FIG. 4 shows the prompt from the trailer maneuvering assistant to the driver of the motor vehicle on central display 2. To avoid having to provide additional control elements in the motor vehicle, the operation is carried out using the mirror adjusting switch in the present specific embodiment. A heading 8 having the text "Operation with mirror adjusting switch" as well as a mirror adjusting switch symbol 9, including prompts, are displayed, namely "Flip switch!" and "Fix direction," including corresponding directional arrows of the employed degrees of freedom of the mirror adjusting switch. The prompt in central display 2 disappears upon operating the mirror adjusting switch or when the vehicle is set in motion.

Figure 5:
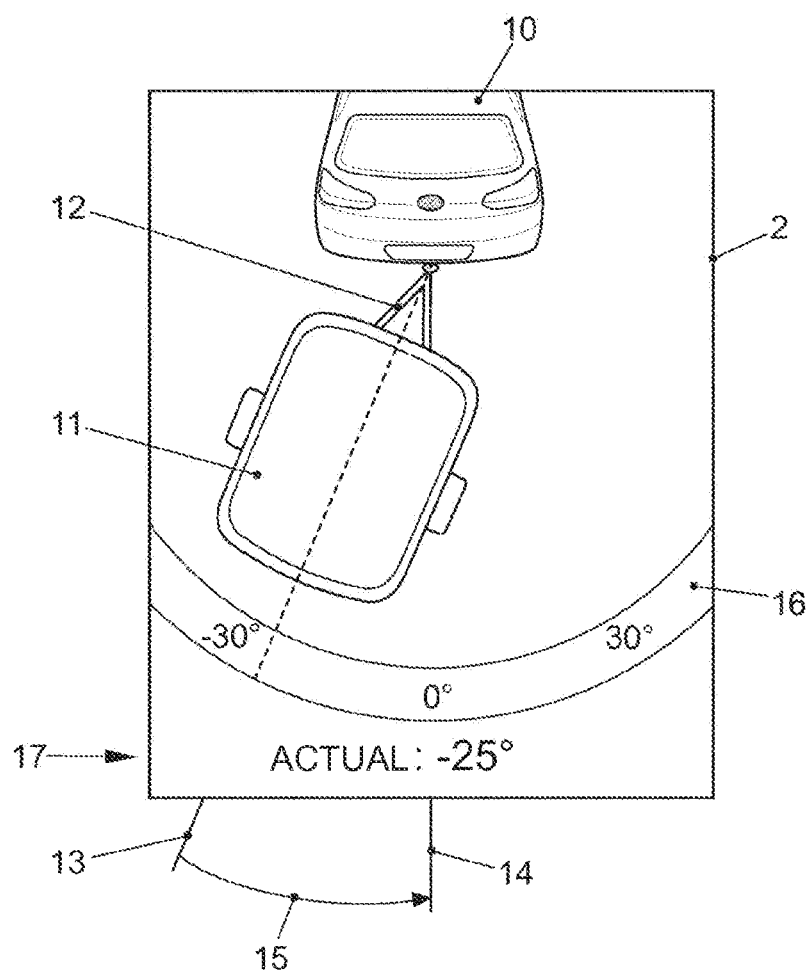
FIG. 5 shows a start screen of the active trailer maneuvering assistant.

FIG. 5 shows the beginning of an activated trailer maneuvering assistant. The instantaneous combination situation, comprising vehicle 10 and trailer 11, to which the vehicle is connected via a tow bar 12, is displayed in central display 2. The combinations which may be maneuvered by the trailer maneuvering assistant may always be non-steerable trailers, i.e., trailers having a rigid tow bar. Non-steerable trailers of this type are, for example, single-axle trailers such as campers, smaller trailers or pleasure craft trailers. To a certain extent, two-axle trailers also come under the definition of non-steerable trailers if the two axles are disposed close together and none of the axles are steerable. In common truck trailers, the front axle is normally steerable with the aid of the tow bar, and the present trailer maneuvering assistant is unable to maneuver a constellation of this type.

Articulation 15, which is formed by longitudinal axis 13 of trailer 11 with longitudinal axis 14 of motor vehicle 10, is determined with the aid of a rear-view camera (not illustrated) of vehicle 10 and, in FIG. 5, the instantaneous situation is displayed in central display 2, as viewed from above, so that the driver is notified of the actual or initial state. To improve the perception of the combination situation, an angle band 16 is furthermore displayed as a circle segment in central display 2, so that the driver may visually perceive instantaneous articulation 15 on the basis of the passage of longitudinal axis 13 of trailer 11 through angle band 16. Measured instantaneous articulation 15 is furthermore displayed as the actual angle within angle band 16 in text form in a text box 17.

Figure 6:
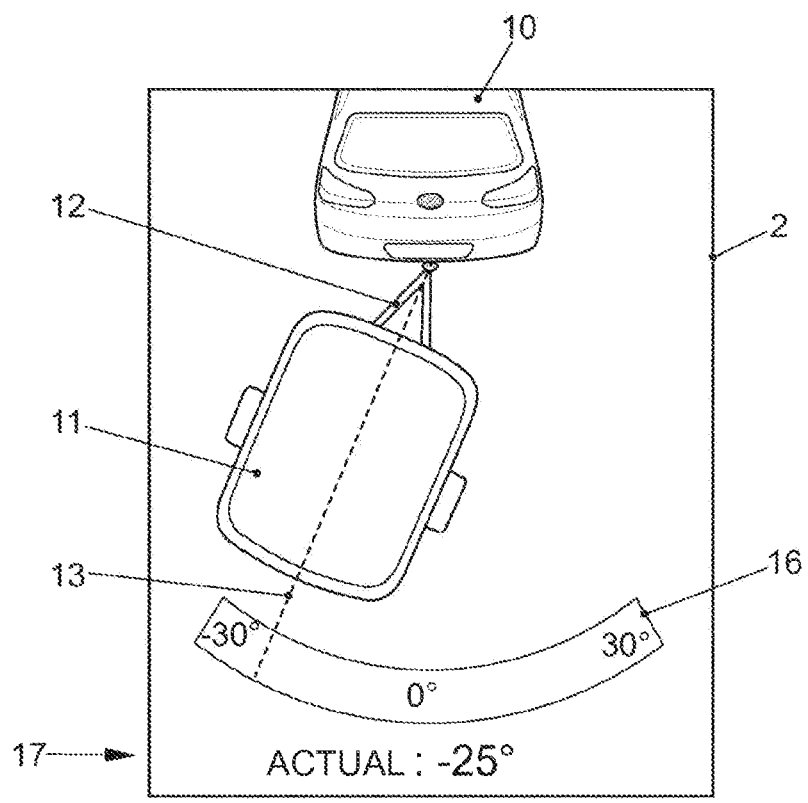
FIG. 6 shows a display of the trailer maneuvering assistant, including a detected tow bar.

FIG. 6 shows the next step in the sequence of the trailer maneuvering assistant, in which the maximum possible articulation of trailer 11 relative to tow vehicle 10 is determined with the aid of the rear-view camera on the basis of the length of tow bar 12. The length of the tow bar and the geometric dimensions of the trailer may be derived from the images of the surroundings. Angle band 16 is limited as a result of the determination of the maximum possible articulation. It is limited to +/−30° in the present example.

Figure 7:
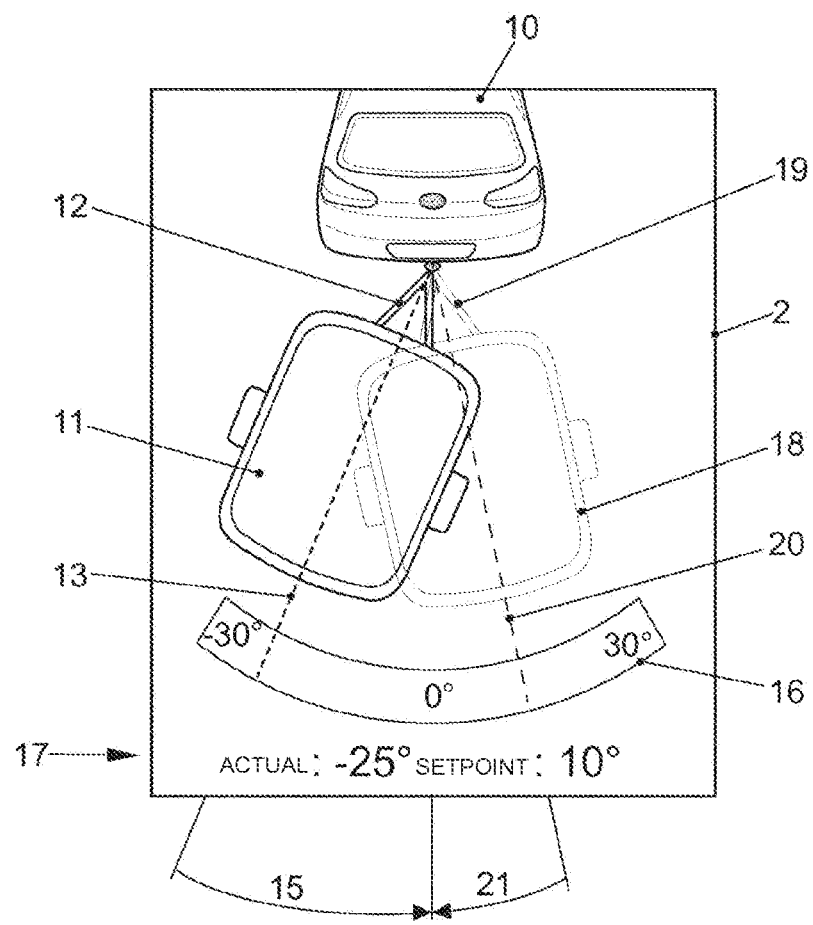
FIG. 7 shows a display of the trailer maneuvering assistant with a set angle.

The subsequent step of the active trailer maneuvering assistant is explained in FIG. 7, namely the setting of the setpoint angle with the aid of the mirror adjusting switch. Central display 2 shows the image of tow vehicle 10 including trailer 11 in the actual position, which is referred to below as the actual trailer, as well as tow bar 12 in the actual state, and sketched longitudinal axis 13 of actual trailer 11, whereby actual articulation 15 is displayed in angle band 16.

The driver of tow vehicle 10 now sets, at the mirror adjusting switch, setpoint articulation 12 of the trailer, which is needed for maneuvering, to maneuver the combination of tow vehicle 10 and trailer 11 into the desired target position. This is displayed graphically in central display 2 by displaying a setpoint trailer 18, including setpoint tow bar 19, whose setpoint longitudinal axis 20 displays selected setpoint articulation 21 in angle band 16. The two articulations, namely actual articulation 15 and setpoint articulation 21, are displayed again as text bar 17 below angle band 16 for notifying the driver. The driver may therefore change the position of setpoint trailer 18 in central display 2 with the aid of the mirror adjusting switch. This may be achieved in the graphical display, for example in that setpoint trailer 18 is virtually pushed out of actual trailer 11 by the mirror adjusting switch until it has reached the position set by the mirror adjusting switch.

Once setpoint articulation 21, and thus the position of setpoint trailer 18, is set in central display 2, the vehicle is moved in the reverse direction by the trailer maneuvering assistant, the assistant taking over the steering of vehicle 10, while the driver operates the gas and brake pedals. It should be noted that setpoint articulation 21 may, in principle, be changed even during the reversing maneuver, for example if the driver notices that selected setpoint articulation 21 is not optimal.

The actual position of trailer 11 is changed by the maneuver of the trailer maneuvering assistant. In other words, actual trailer 11 shifts in the image of central display 2 during the reversing movement of the combination comprising tow vehicle 10 and actual trailer 11 in the direction of the position of setpoint trailer 18. At the end of the maneuver, the position of setpoint trailer 18 is reached, and actual trailer 11 has shifted in the graphical representation below setpoint trailer 18. Setpoint trailer 18 and actual trailer 11 are therefore identical once the combination has achieved setpoint articulation 21.

Figure 8:
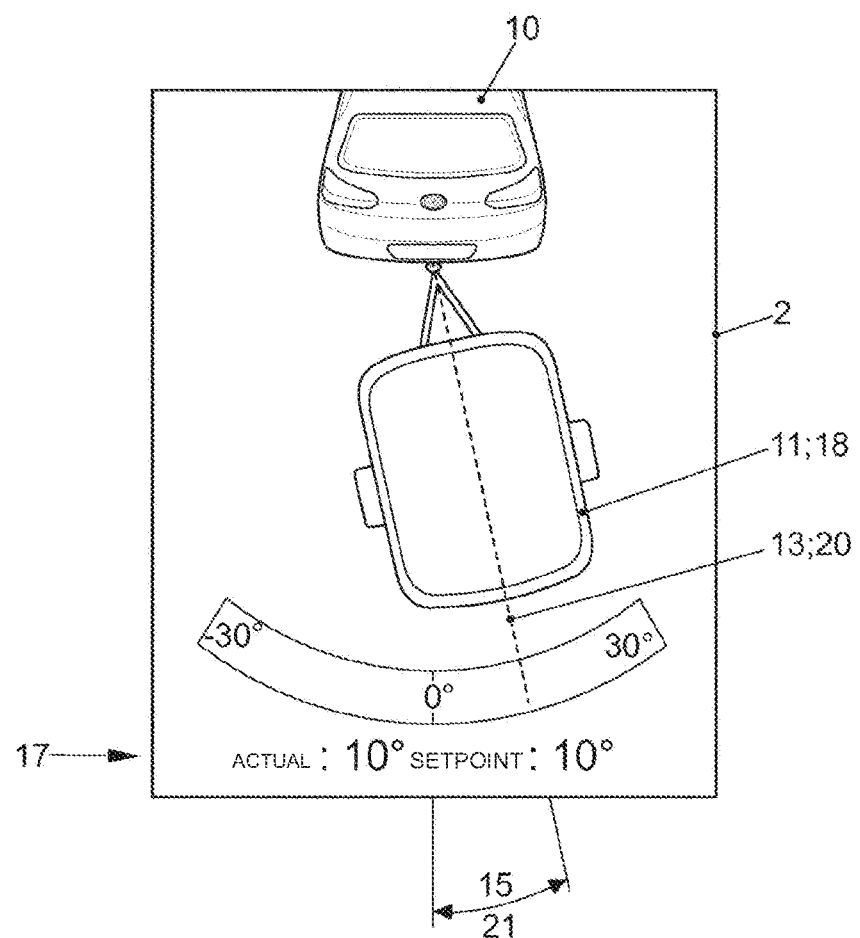
FIG. 8 shows a display of the trailer maneuvering assistant with an achieved angle.

FIG. 8 now shows the situation of the combination when it has reached setpoint articulation 21. In this case, actual trailer 11 and setpoint trailer 18 are identical, as is to be symbolized in FIG. 8 by the simultaneous use of the two reference numerals. In other words, trailer 11, 18 is oriented in the desired direction, and the combination should maintain this direction until it has reached the final target position. The achievement of setpoint articulation 21 is displayed in text box 17 by the text: "ACTUAL: 10° SETPOINT: 10°."

To cause the combination to maintain the direction desired by achieved setpoint articulation 21, the angle between the longitudinal axis of tow vehicle 10 and the longitudinal axis of trailer 11 should be brought to zero by a suitable maneuver, whereby the direction of trailer 11 should not be changed. This is achieved by fixing the achieved setting, in that the trailer maneuvering assistant is, so to speak, "zeroed."

Figure 9:
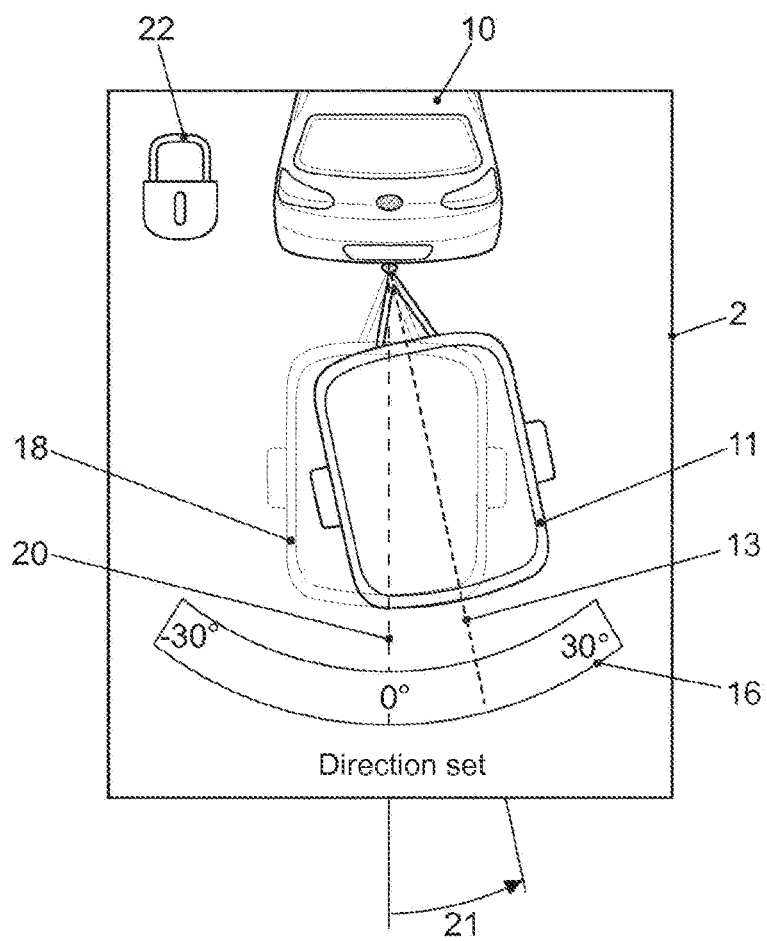
FIG. 9 shows a display of the trailer maneuvering assistant during fixing of a target direction.

FIG. 9 now shows the "zeroing," i.e., the fixing of the direction of achieved setpoint articulation 21 as the new zero mark. This is done by flipping the mirror adjusting switch, as illustrated in FIG. 2, whereby the direction of setpoint articulation 21 is set as the instantaneous orientation. With this zeroing, previous setpoint trailer 18 becomes actual trailer 11 again, and a new virtual setpoint trailer 18 having a virtual longitudinal axis 20 is displayed in the central display, virtual longitudinal axis 20 representing a setpoint articulation of zero degrees. The fixing of the achieved direction of setpoint articulation 21 at 10° by flipping the mirror adjusting switch causes a fixing symbol to be displayed, for example in the shape of a lock symbol. In addition, the text "Direction fixed" is displayed in text bar 17.

To now cause the direction of real-life trailer 11 predetermined by the achievement of setpoint articulation 21 to be maintained during the further maneuvering, the longitudinal axis of tow vehicle 10 should be aligned with longitudinal axis 13 of real-life trailer 11, which now points in the direction of achieved setpoint articulation 21. In principle, this may be achieved in two ways.

One possibility is to maneuver the combination in the reverse direction in such a way that the predetermined direction is maintained, but a parallel offset is permitted. This first mode may be selected in the case of a wide roadway, in which it doesn't matter so much that the combination should maneuver within narrow limits. One example hereof would be maneuvering a trailer for sports purposes on a large meadow or a large parking space. In this first mode, the instantaneous orientation of the trailer is recorded and used as the setpoint orientation. The target trajectory of the first mode is then parallel to the instantaneous direction of travel of trailer 11, and the assistant-supported maneuvering may take place as a single-point maneuver. The final target position of the combination is then offset by a slight distance next to the target position aimed at by the instantaneous direction of travel of the trailer. The slight parallel offset is, however, not disruptive if sufficient space is available.

The second option is contingent upon a maneuvering within narrow surroundings. If narrow surroundings are present, for example if the combination is to be maneuvered into a parking space or a driveway or an alley, a parallel offset is not permitted, but instead the instantaneous direction of the trailer should be maintained to reach the final target position. In this mode as well, the instantaneous orientation of the trailer is recorded and used as the setpoint orientation. In this mode, however, the target trajectory should lie precisely in the direction of the instantaneous orientation, without a parallel offset, since a parallel offset is not possible within the narrow surroundings. This generally requires a multi-point maneuvering, and the driver is prompted by the trailer maneuvering assistant to change gears.

In both modes, during the maneuvering, instantaneous actual trailer 11 moves under virtual setpoint trailer 18 displayed under the angle of zero degrees in central display 2.

Figure 10:
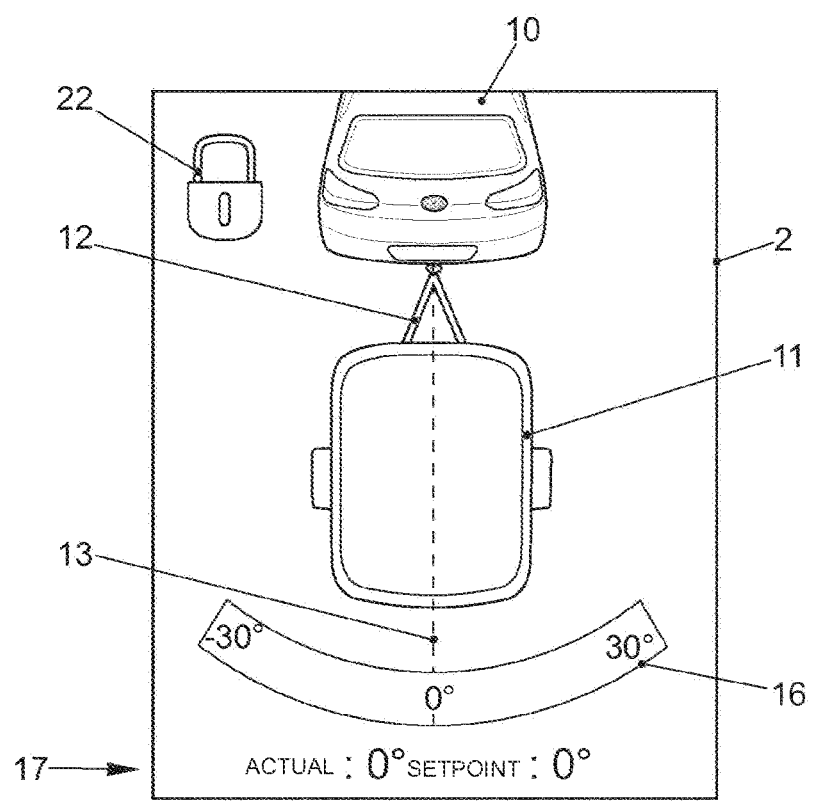
FIG. 10 shows a display of the trailer maneuvering assistant upon reaching a target position.

FIG. 10 shows the representation in central display 2 when the target position is reached, the target position being the position of the combination in which the longitudinal axis of vehicle 10 coincides with longitudinal axis 13 of trailer 11. Longitudinal axis 13 of the position of real-life trailer 11 intersects angle band 16 at zero degrees, the zero degree direction corresponding to the orientation of target articulation 21 in FIGS. 7 and 8, which is clarified by fixing symbol 22. The reaching of the target position is furthermore displayed by the text "ACTUAL: 0° SETPOINT: 0°" in text bar 17. Starting at the reached target position, the trailer maneuvering assistant may move the combination comprising tow vehicle 10 and trailer 11 on a straight trajectory in the reverse direction into the final parking position.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for maneuvering a combination comprising a tow vehicle and a trailer, the trailer being connected to the tow vehicle with the aid of a non-steerable tow bar and the tow vehicle monitoring the rear surroundings, including the trailer with the aid of a rear-view camera, the method comprising:

determining, using a control device, an actual articulation of the trailer relative to the tow vehicle;

determining a tow bar length and a maximum articulation of the trailer;

inputting a setpoint articulation of the trailer;

reversing the tow vehicle with at least active steering assistance until achieving the setpoint articulation of the trailer;

fixing a direction of travel predetermined by the setpoint articulation; and maneuvering the tow vehicle with at least active steering assistance and maintaining a predetermined direction of travel until reaching a final parking position.

2. The method according to claim 1, wherein, while maneuvering the tow vehicle, a longitudinal axis of the tow vehicle is brought into alignment with a longitudinal axis of the trailer thereby maintaining the predetermined direction of travel, and in a subsequent step, a reversing of the combination oriented in a straight line takes place with at least the active steering assistance until the final parking position is reached.

3. The method according to claim 2, wherein, to bring the tow vehicle into alignment with the longitudinal axis of the trailer, two modes are available, a first mode relating to the maneuvering on a wide roadway and a second mode relating to maneuvering on a narrow roadway.

4. The method according to claim 3, wherein alignment of the tow vehicle with the longitudinal axis of the trailer is carried out in the first mode in a single-point maneuver, so that a target trajectory for reaching the final parking position in the first mode is parallel to the predetermined direction of travel.

5. The method according to claim 3, wherein alignment of the tow vehicle with the longitudinal axis of the trailer is carried out in the second mode in a multi-point maneuver, so that the target trajectory for reaching the final parking position in the second mode is in the predetermined direction of travel.

6. The method according to claim 1, wherein the setpoint articulation is inputted while stopped or while reversing.

7. The method according to claim 1, wherein the setpoint articulation is inputted via a user interface into a trailer maneuvering assistant of a motor vehicle.

8. A trailer maneuvering assistant of a motor vehicle comprising:

a control device, wherein the control device is configured to:

determine an actual articulation of the trailer relative to the tow vehicle;

determine a tow bar length and a maximum articulation of the trailer;

input a setpoint articulation of the trailer;

revise the tow vehicle with at least active steering assistance until achieving the setpoint articulation of the trailer;

fix a direction of travel predetermined by the setpoint articulation; and maneuver the tow vehicle with at least active steering assistance and maintain the predetermined direction of travel until reaching a final parking position, wherein the trailer maneuvering assistant comprises:

an HMI (Human Machine Interface) device for communicating with a driver of the vehicle;

a device for detecting a coupled trailer; and an actuator for actuating a steering system, wherein the trailer maneuvering assistant has a rear-view camera for recording images of the rear surroundings, wherein the control device has a device for determining the actual articulation and for determining the maximum permissible articulation of the coupled trailer from images of the rear-view camera, wherein the HMI device has a device for entering a setpoint articulation of the trailer, and wherein the HMI device dynamically displays an actual position of the trailer in the actual articulation and a setpoint position of the trailer in the setpoint articulation.

9. The trailer maneuvering assistant according to claim 8, wherein, to activate the trailer maneuvering assistant, the HMI device transmits a predetermined number of informational indications to the driver of the motor vehicle.

10. The trailer maneuvering assistant according to claim 8, wherein the HMI device has a device for fixing an achieved setpoint articulation, and wherein the control unit uses a fixed setpoint articulation as the predetermined direction for ascertaining a target trajectory for reaching the final parking position.

11. The trailer maneuvering assistant according to claim 10, wherein the HMI device has a selecting device, with the aid of which it is selected whether the target trajectory runs parallel to the predetermined direction or in the direction of the predetermined direction.

* * * * *